March 28, 1939.  F. KENNISON ET AL  2,151,974
MACHINE FOR ASSEMBLING SHOE PARTS
Filed Sept. 16, 1937   8 Sheets-Sheet 7
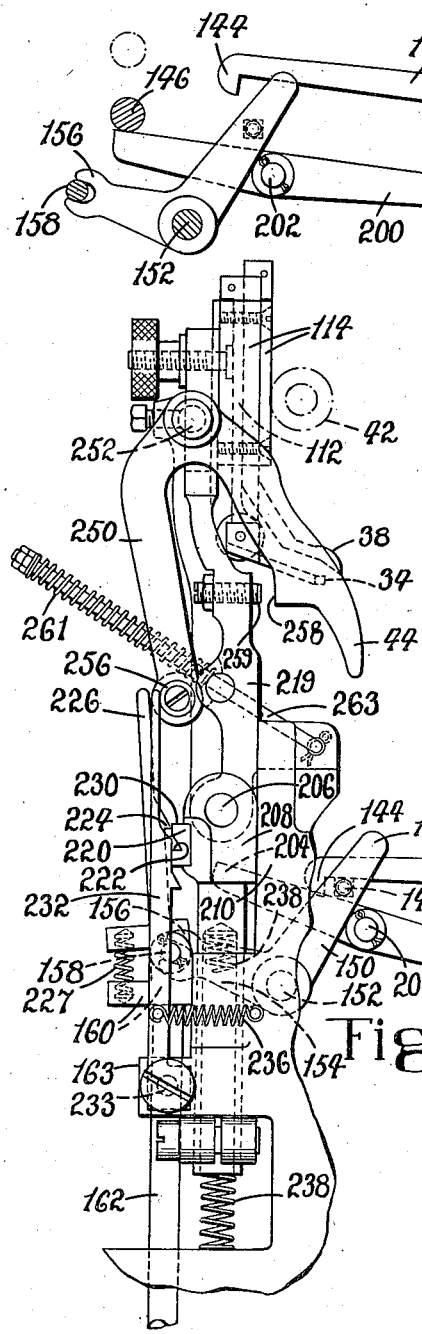
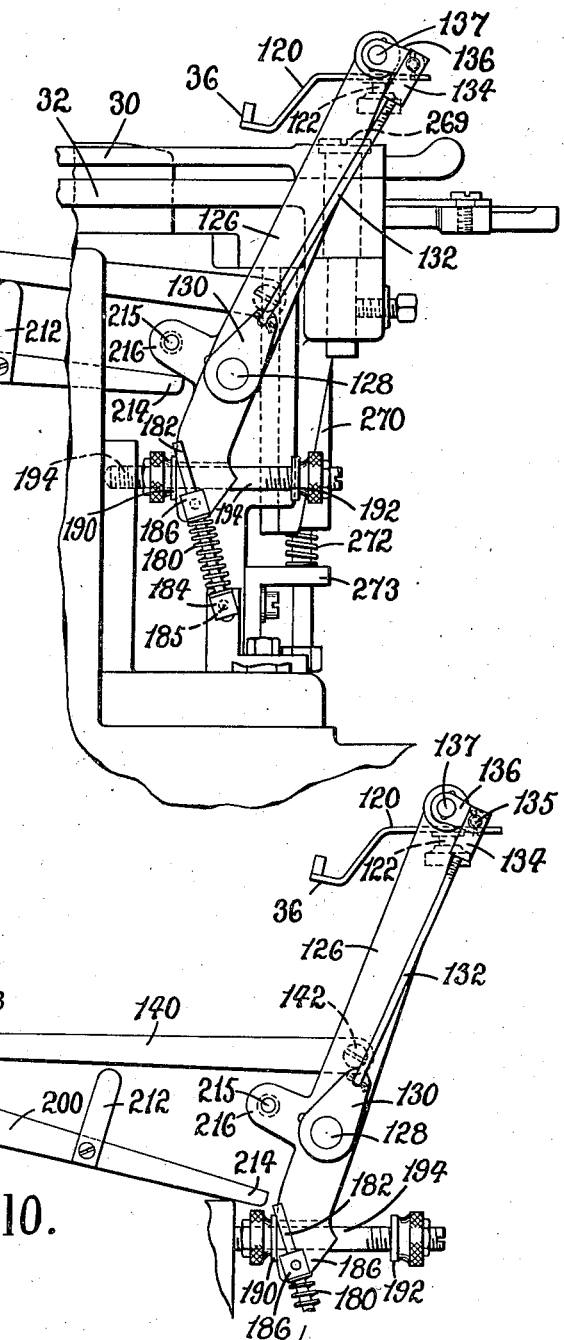
Fig. 9.
Fig. 10.
INVENTORS
Frank Kennison
Frank E. Stratton
By their Attorney
Victor Cobb

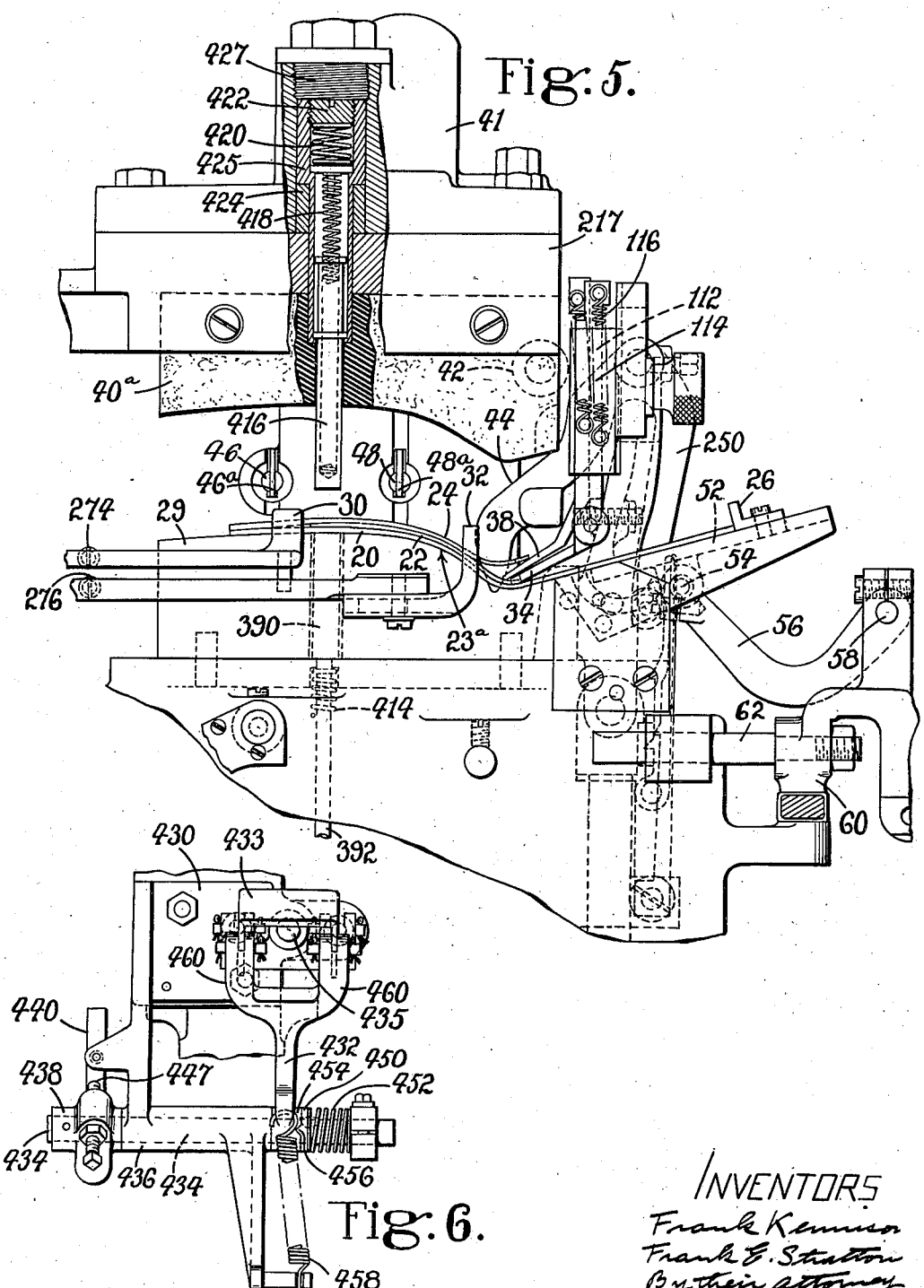

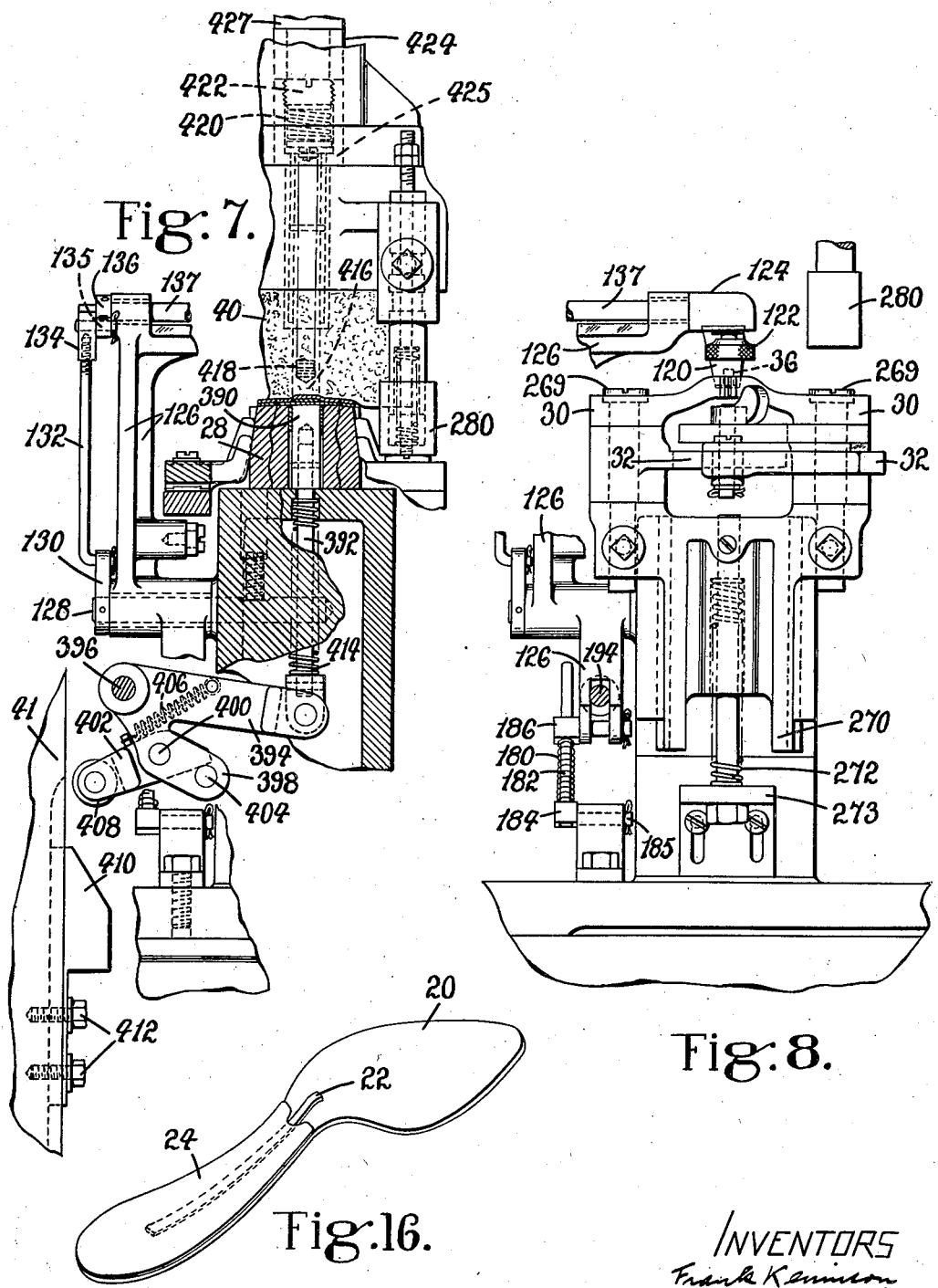

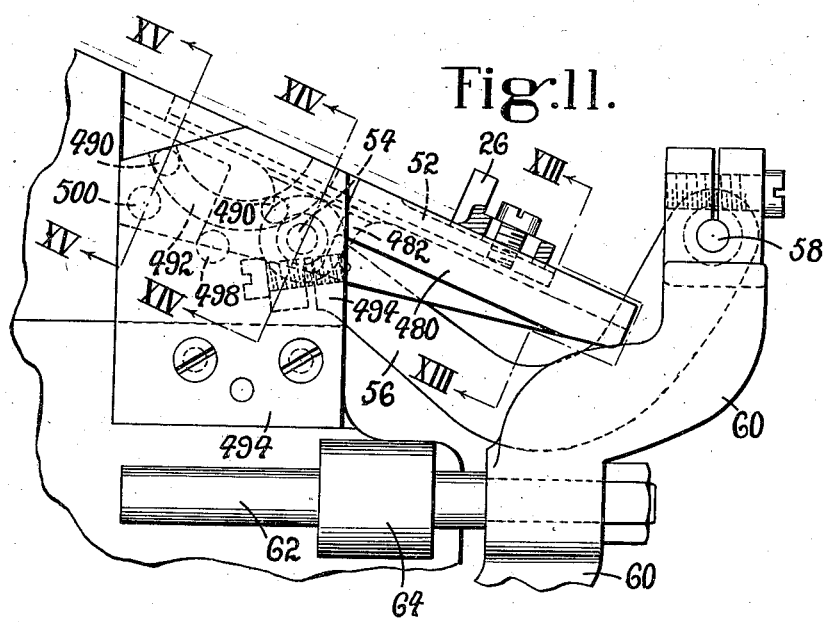
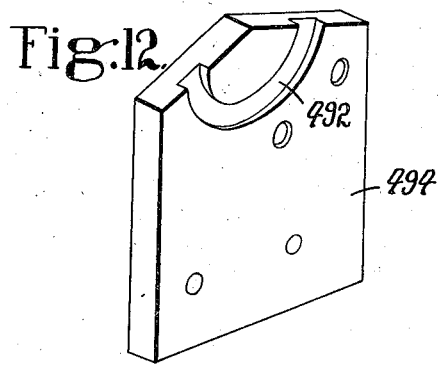
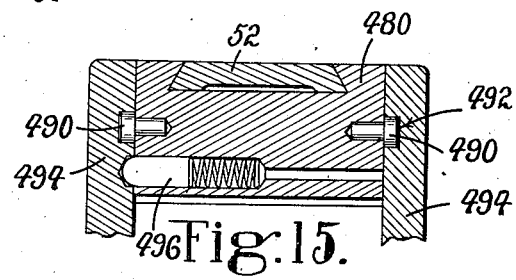
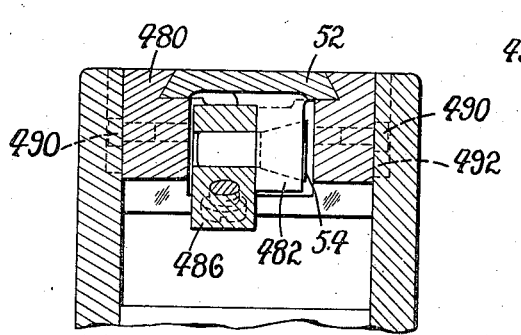
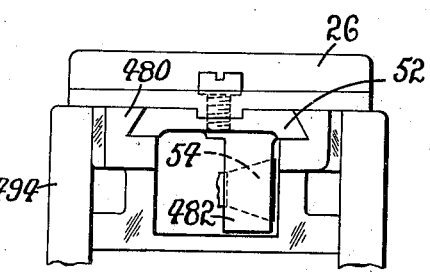

Patented Mar. 28, 1939

2,151,974

UNITED STATES PATENT OFFICE 2,151,974

MACHINE FOR ASSEMBLING SHOE PARTS

Frank Kennison and Frank E. Stratton, Beverly, Mass., assignors to United Shoe Machinery Corporation, Paterson, N. J., a corporation of New Jersey Application September 16, 1937, Serial No. 164,206

24 Claims. (Cl. 12—17)

This invention relates to machines for assembling shoe parts. More specifically, the invention embodies mechanisms for assembling and subsequently molding an insole unit made up of an insole member, a shank stiffener, and a reinforcing piece which covers the shank stiffener. While, in the illustrated embodiment of the invention, mechanisms are provided for performing both assembling and molding operations upon shoe parts, it is to be understood that the invention and various important features thereof may have other applications and uses.

It is an object of the invention to provide a twin machine useful in the assembling and molding of shoe parts, with provision for adjustment of certain shoe part positioning members or gages in the twin mechanisms of the machine through a single operating member, thus facilitating adjustment of both mechanisms for variations in lengths, sizes and styles of the shoe parts to be operated upon. It is another object of the invention to facilitate the assembling of certain shoe parts in a manner to insure accuracy in the relative positions of these parts. It is a still further object of the invention to provide improved means for ejecting the completed shoe part, thus conditioning the machine, without effort on the part of the operator, for subsequent operations.

To these ends, and in accordance with an important feature of the invention, a unitary means is provided in a twin assembling machine for adjusting work positioning members associated with both of the assembling mechanisms, this adjustment being conveniently secured simultaneously through the operation of a single manually operable member slidably movable in the direction of its length. It is an advantage of this construction that means for predetermining the adjustment of such work positioning members for variations in lengths, sizes and styles may be controlled from a single source for both of the mechanisms, thereby substantially reducing the number of operations which would otherwise be necessary in the case of individual adjustment of such work positioning means for each mechanism.

An important feature of the invention relates to the provision of work positioning members adapted to engage and locate opposite ends of a shoe part to insure its correct position as a preliminary to subsequent operations, such as that of molding an insole unit made up of various parts. In the illustrated construction, two work positioning members engage and position the opposite ends of a shank stiffener to locate the latter both longitudinally and transversely of an insole member with which the shank stiffener is to be assembled, the arrangement being preferably such that the means for moving one of such positioning members to operative position also effects movement of the other work positioning member in timed relation to the first positioning member. Conveniently, the means for moving said work positioning members to operative position is under manual control so arranged that both positioning members move to operative position upon a given movement of a manually operable member in an arrangement wherein a second movement of the same manually operable member effects return of one of said positioning members to its initial position of rest while the other remains in operative position. Preferably a holddown is provided to engage the shank stiffener, to prevent displacement of the latter, prior to the removal of one of the positioning members used to locate the shank stiffener on the insole member. Conveniently, the holddown is moved to operative position by said manually operable member.

A further important feature of the invention resides in the provision of ejector means by which a completed shoe part, such as an insole unit, is removed from the machine without effort on the part of the operator. Conveniently, the ejector means is mounted to move with one of the molding members and is arranged to be operated at a predetermined point in the separating movement of the molding members whereby the finished article is ejected after each molding operation. Since, in the illustrated machine, gage members are provided for locating a shoe part on one of the mold members in an organization wherein such gage members normally project above the level of the supporting mold member, means is provided for positioning the molded shoe part above the level of the supporting mold member and above the gages, so that the finished article may be ejected in a direction transversely of the supporting mold member. As illustrated, plungers are provided which are movable through openings in the mold members to engage the upper and lower surfaces, respectively, of the finished article to hold it in position for the action of the ejector means. Preferably, one of the positioning plungers is backed by spring means so that the completed work piece is yieldingly held by the plungers, thus facilitating the action of the ejector means.

These and other important features of the invention and novel combination of parts will now be described in detail in the specification and then pointed out more particularly in the appended claims.

In the drawings,

Fig. 3a is an enlarged detail view of an adjusting mechanism shown in Fig. 3.

Fig. 5 is an enlarged detail view of an assembling and molding unit showing a set of molds of a different type from that of Fig. 3, and indicating the adaptability of the mechanism for various kinds of work;

Fig. 6 is a detail of the ejector mechanism shown at the right in Fig. 2;

Fig. 7 is a detail view, partly in section, of means for positioning a molded insole unit for ejection from the machine;

Fig. 8 is a detail view of parts of the mechanism visible upon looking in the direction of the arrow VIII in Fig. 3;

Fig. 9 is an enlarged detail view of mechanism for operating a shank stiffener gage, said mechanism being shown as seen from the back in Fig. 3;

Fig. 10 is a detail view showing mechanism of Fig. 9 in a different position, and showing also details of mechanism for operating other shoe part gages, this view being also shown as seen from the back in Fig. 3;

Fig. 11 is an enlarged detail view of the toe gage mechanism shown at the right in Fig. 3;

Fig. 12 is a detail of Fig. 11;

Fig. 13 is a view along the line XIII—XIII, looking in the direction of the arrows, in Fig. 11;

Fig. 14 is a sectional view along the lines XIV—XIV of Fig. 11;

Fig. 15 is a sectional view along the line XV—XV of Fig. 11; and

Fig. 16 is a perspective view of a molded insole unit.

Figure 3:
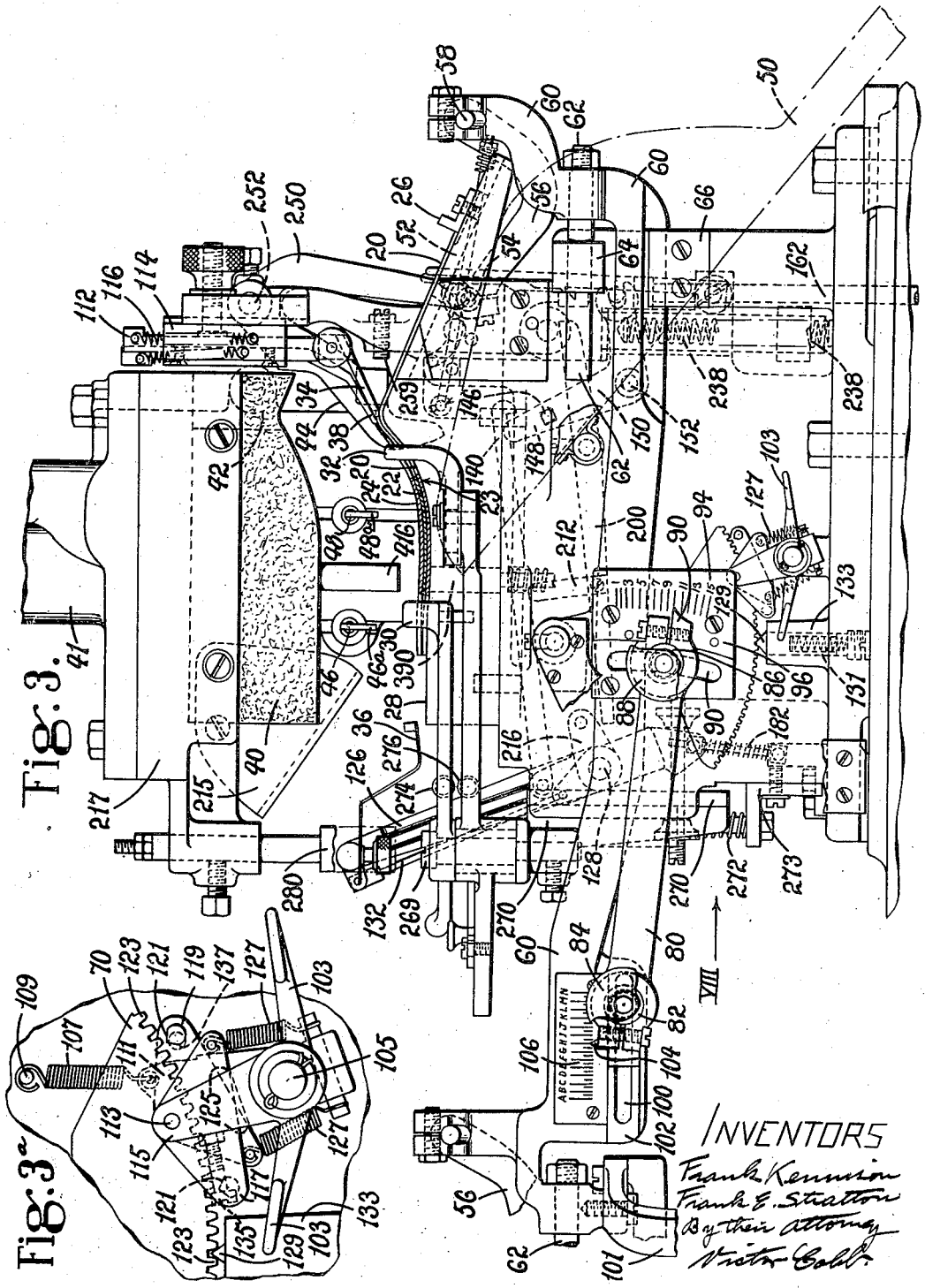
Fig. 3 is an enlarged front view of the righthand assembling and molding unit of Fig. 1, with the parts in work receiving position.
Figure 4:
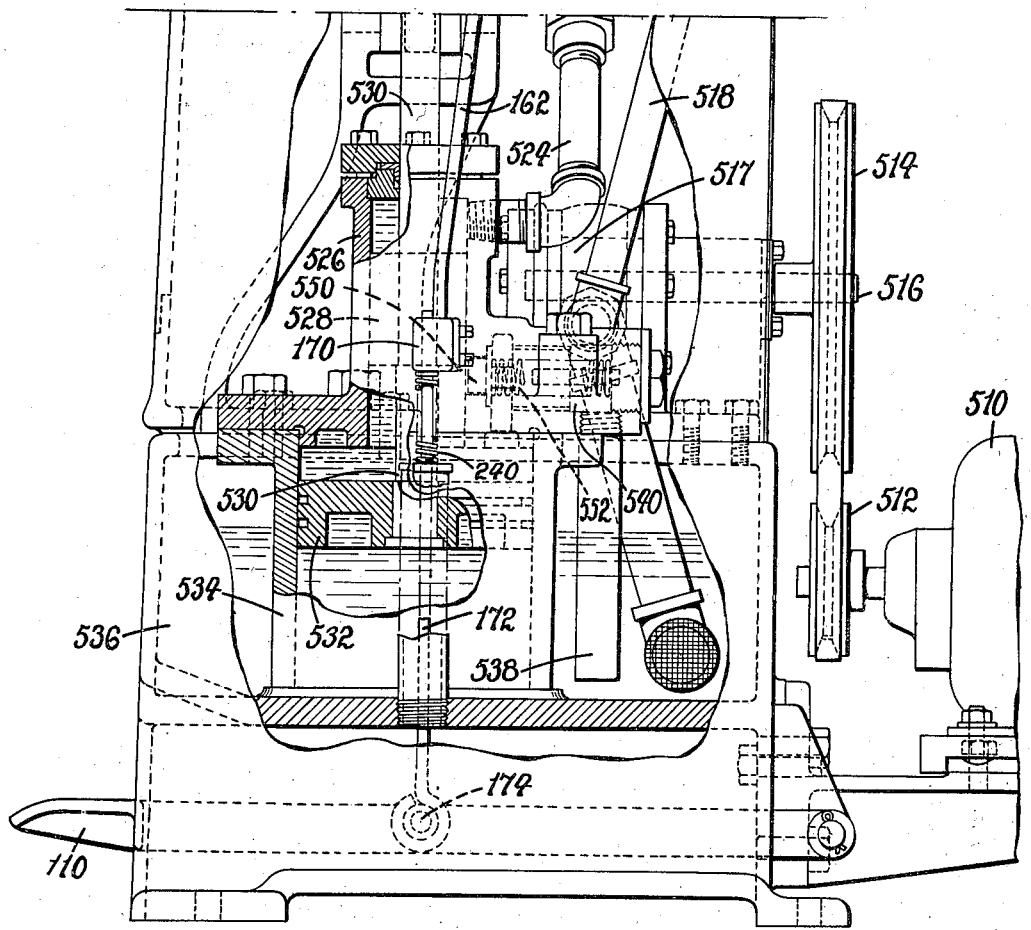
Fig. 4 is a detail view of the hydraulic means for operating the molding mechanisms, this view being below the level of the parts shown in Fig. 2.

The illustrated embodiment of the invention is designed particularly for performing assembling and molding operations upon a shoe bottom unit of the type known as a reinforced insole. As indicated in Figs. 3, 4 and 16, this insole unit comprises an insole member 20, a steel shank stiffener 22 and a reinforcing piece 24. Prior to being assembled in this machine a suitable adhesive was applied to the opposing surfaces of the insole member 20 and the reinforcing piece 24 so that during the molding operation these parts will be caused to adhere firmly to each other.

Figure 1:
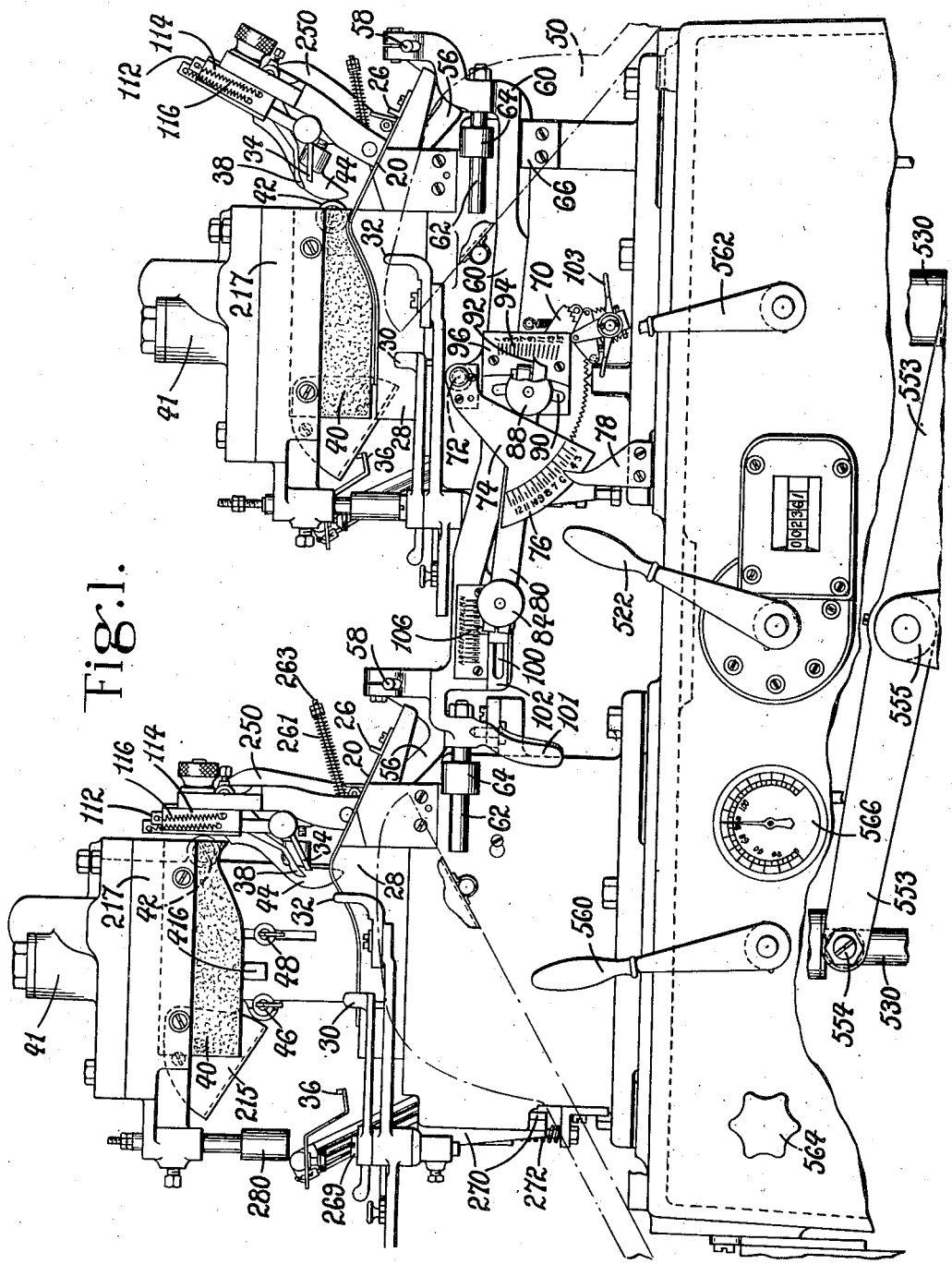
Fig. 1 is a front view of a twin assembling and molding machine.

As illustrated in Fig. 1, the machine comprises two substantially identical assembling and molding mechanisms, so that an insole unit may be assembled by the operator in one of these mechanisms while the other is completing the molding operation on a previously assembled unit. It will be readily understood that a description of one of these mechanisms applies equally to the other. As shown, each assembling mechanism comprises a toe gage 26 against which the forward end of the toe portion of the insole member 20 may be placed to locate said insole member on a mold 28 (or 29, Fig. 5). This toe gage 26 is adjustable for soles of different sizes, lengths and styles by means which will be hereinafter described. For locating the insole member 20 on the mold 28 widthwise of the latter there are provided pairs of gage members 30, 32 spring pressed toward each other to center the insole member on the mold 28. With the insole member thus positioned on the mold, the operator depresses a treadle to bring a positioning or gage member 34 (Figs. 1 and 3) down upon the insole member 20 to serve as a positioning member for the front end of the steel shank piece 22. At the same time a second positioning or gage member 36 moves inwardly from the position shown in Figs. 1 and 3 to a position in which it contacts the upper surface of the insole member 20 to serve as a locating member for the rear end of the steel shank stiffener 22. When the shank stiffener has been located, the operator depresses the treadle another step, thereby bringing a holddown 38 into contact with the assembled shank stiffener and insole member to hold them in assembled position. An instant later the positioning gage 36 is withdrawn to its initial position, shown in Figs. 1 and 3, as a result of the described second depression of the treadle. Then a reinforcing piece 24 is placed by hand above the shank stiffener, said reinforcing piece being located by the thumb or finger so that its rear end is in vertical alinement with the rear end of the insole member, as most clearly shown in Fig. 3, the reinforcing piece 24 being centered on the insole member in widthwise direction by the same gage members 30, 32 which operated to locate the insole member 20 on the mold 28. With the parts thus assembled, the operator initiates a pressure applying operation by which a pad or co-operating mold member 40, or a pad 40a (Fig. 5) in an overhanging arm 41, is caused to descend to effect, in co-operation with the mold 28 or 29, a molding operation, as shown at the right in Fig. 1 of the drawings. During descent of the pad 40, a cam roll 42 movable with the pad co-operates with a cam surface on a cam member 44 to effect withdrawal of the positioning member 34 and the holddown 38 out of the path of the pad 40. At the end of a molding operation which is terminated at will by the operator, the pad 40 is lifted to the position shown at the left in Fig. 1. During this upward movement of the pad 40, ejector members 46, 48 are caused to eject the assembled insole unit from its position between the upper (40) and lower (28) mold members, a delivery trough 50 being provided to receive the insole unit and deliver it to a suitable receptacle (not shown).

In the illustrated construction, the toe gage 26 is carried by a slide 52 (Figs. 3 and 5) having pivoted thereto, by a pin 54, a curved link 56 having its other end pivoted at 58 to one end of a carrier slide 60 (Fig. 1) having secured thereto adjacent its opposite ends two supporting and guiding pins 62 slidably received in bearings 64 carried by the machine frame, in an arrangement wherein the carrier slide 60 is further guided on the machine frame by a guide member 66. From an inspection of Fig. 1 it is clear that the carrier slide 60 is a unitary connecting member which, through its connections with both toe gages 26, may be utilized to effect simultaneous adjustment of said toe gages.

Conveniently, and as shown, provision is made for adjusting the toe gages 26 for size, for length, and for style, thus facilitating greatly the work of the operator in assembling insole units for different sizes and styles of shoes. As most clearly shown in Figs. 1 and 3, adjustment of the carrier slide 60, and, therefore, of the toe gages 26, for size is secured by an operating member 70 in the form of a lever pivoted at 72 on the machine frame and having secured thereto an arm 74 which carries a size scale 76, a stationary pointer 78 being provided for co-operation with the scale 76 for indicating any one of a range of sizes which is arbitrarily shown as sizes 3 to 12, inclusive. It is to be understood that the member 70 is connected to the carrier slide 60 by a transmission link member 80 adjustably connected or attached at one end to the carrier slide 60 by clamping members 82 (Fig. 3) operable by a hand operated member 84. At its other end the transmission member 80 is adjustably secured to the operating member 70 by a second clamping device 86 (Fig. 3) operable by a hand operating member 88. By loosening the member 88, the adjacent end of the transmission member 80 may be moved lengthwise of a curved slot 90 in the operating member 70. When this member 70 is set, as shown in Fig. 1, with the pointer 78 at size 5 on the scale 76, the end of the transmission member 80 adjacent to the slot 90 may be moved along the slot without effecting any movement of the carrier slide 60 with respect to the operating member 70. However, if the member 70 be swung to the right in Fig. 1 about its pivot 72, after loosening the clamping device 86, until the pointer 78 points, for example, to size 9 on the scale 76, then adjustment of the adjacent end of the transmission member 80 along the slot 90 will effect adjustment of the carrier slide 60 relative to the member 70. As a matter of fact, this adjustment along the curved slot 90 changes the setting of the gages 26 in accordance with the variations in the style of the insole member. Conveniently, the adjustment of the clamp device 86 is indicated by a pointer 92 movable along a scale 94 on a plate 96 carried by the member 70. In this connection it is to be understood that different styles of insoles of the same size (and of the same width, susbtantially) vary considerably in length, as graphically shown in Fig. 8 of the drawings in United States Letters Patent No. 1,315,171, granted September 2, 1919, upon application of W. C. Stewart. Hence, in setting the gages 26 for insoles of different sizes, as indicated by scale 76, allowance must also be made for any change in length resulting from a change in the style of insole, in which case the transmission member 80 must be adjusted along the arcuate slot 90 to an extent indicated by the scale 94. It will be further observed that the transmission member 80 may be adjusted relatively to the carrier slide 60 along a slot 100 in a bracket 102 rigid with the carrier slide 60. To effect the described adjustment, the clamping member 82 (Fig. 3) is first loosened by proper manipulation of the hand operated member 84 whereupon the transmission member may be adjusted lengthwise of the slot 100 by movement of the slide 60 relatively to the transmission member 80 to the desired position, as indicated by a pointer 104 carried by the member 80, which is movable along a scale 106 rigidly mounted on the carrier slide 60. This adjustment of the carrier slide 60 will serve to adjust the gages 26 according to the length of the insole. In this connection, it is to be understood that this adjustment will ordinarily be used only in cases of unusual styles such, for instance, as in extremely pointed toes. This means a change in the range of lengths not taken care of by the usual adjustment which accompanies a change in style. The scale 106 is also useful to indicate changes in the range of lengths due to the marked changes in lengths between men's, women's and children's insoles. Following the adjusting operation the parts are secured in the new relation by proper manipulation of the member 84.

To move the carrier slide 60, the operator may grasp a handle 101 by which said carrier may be adjusted by causing the guiding and supporting pins 62 to slide in their bearings 64. The handle 101 will be employed to move the carrier slide 60 only when it is desired to effect a considerable movement of the latter. Commonly, adjustment of the carrier slide will be effected by means of a lever mechanism shown in detail in Fig. 3a. This mechanism comprises a two-winged lever 103 mounted for rocking movement on a stud 105 carried by the frame of the machine, a spring 107 being provided to maintain the lever 103 in neutral position, said spring 107 being secured to a pin 109, carried by the frame of the machine, and to an arm 111 rigid with the lever 103. Pivoted at 113 at the upper end of an arm 115 rigid with the lever 103 are two pawls 117 and 119 each having a tooth, as at 121, for selective engagement with any one of a number of teeth 123 carried by the lever 70. As shown, the pawls 117 and 119 are each held yieldingly against a shoulder at 125 on the arm 115 by means of a spring 127. It will be clear upon inspection of Fig. 3a that downward movement of the right end of the lever 103 will cause the tooth of the pawl 117 to engage with a tooth 123 on the lever 70 to move the latter toward the right in Figs. 3 and 3a. During this movement of the lever 70, a spring pressed plunger 129 (Fig. 3) is pushed back against a spring 131 in a post 133. The spring later operates to project the plunger 129 into engagement between two teeth 123 to hold the lever 70 in its adjusted position. When it is desired to move the lever 70 to the left in Figs. 3 and 3a, the operator will depress the left end of the lever 103, thereby causing the tooth 121 on the pawl 119 to engage a tooth 123 on the lever 70. Movement of the pawl 117 is limited to one tooth movement of the lever 70 by a stop 135 carried by the pawl coming into engagement with the post 133. For a similar purpose, a stop 137 on the pawl 119 engages the arm 111. Since, upon release of the lever 103, the spring 107 promptly returns the latter to its initial position, the said lever 103 may be rapidly operated by tapping on either broad end thereof to effect step-by-step movement of the lever 70 about its pivot 72 in the desired direction.

As stated above, when the insole 20 has been placed on the mold 28, the operator will depress a treadle 110 (Fig. 4) to bring the positioning member or gage 34 down upon the exposed surface of the insole 20, the gage 34 having a forked lower end (Fig. 2) for the purpose of locating the front end of the steel shank stiffener 22 in a widthwise direction on the insole 20, the front end of the shank stiffener engaging at the same time a shoulder on said end of the gage 34 to locate the stiffener in a lengthwise direction on the insole as indicated in Fig. 5. As shown in Figs. 1, 3, 5 and 10, the gage 34 is carried by a bar or slide 112 mounted in a guide block 114, a spring 116 being provided to hold the slide 112 yieldingly in lowered position so that the gage member 34 yieldingly engages the insole 20 upon depression of the treadle. At the same time that the gage 34 is brought down upon the insole 20 to locate the forward end of a steel shank stiffener, the positioning member 36 is moved inwardly from its position in Fig. 1 to serve as a gage for the rear end of the same shank stiffener. The means for accomplishing the desired movements of the gage 36 are shown in detail in Figs. 3, 7, 8, 9 and 10 of the drawings. It will be observed that the gage 36 is at the end of a spring member 120 secured by a set screw 122 to a rotary member 124 (Fig. 8) mounted for rocking movement in the upper end of a lever 126 (Figs. 9 and 10) pivoted on a stationary stud 128 carried by the machine frame. Secured to the stud 128 is an arm 130 in the upper end of which is pivoted a link 132, the upper end of which is screwed into a short block 134 in turn pivoted at 135 to the outer end of an arm 136 rigidly secured to a rotary shaft 137 rigidly carrying the member 124. It follows that, when the lever 126 is moved to the right in Fig. 3 (to the left in Figs. 9 and 10) to bring the gage 36 into gaging position over the insole 20, the member 124 is rocked in a counterclockwise direction thus lifting the gage 36 into proper position to engage the top of the insole 20 on the mold 28. The gage 36 has practically a horizontal motion as a result of the compound motions described.

For swinging the lever 126 to bring the gage 36 into gaging position for a shank stiffener, there is provided operating means comprising a link 140 (Figs. 3, 9 and 10) pivoted at 142 to the lever 126 and having a hooked end at 144 adapted to be engaged by a pin 146 carried by arm 148 of a bell crank lever 150 pivoted at 152 on the machine frame and having a second arm 154 with a forked extremity 156 in constant engagement with a stud 158 carried by a bifurcated block 160 (Fig. 2) secured to the upper end of a rod 162 mounted for vertical sliding movement through suitable bearings in a stationary bracket 163 and in the base plate 164 of the machine frame and in the upper wall 166 of a casing 168 which encloses the power plant of the machine. At its lower end the rod 162 has adjustably secured thereto a sleeve 170 to which is pivoted the upper end of a second link 172 (Figs. 2 and 4) the lower end of which is pivoted at 174 (Fig. 4) to the treadle 110. It follows that downward movement of the treadle 110 causes, among other things, swinging of the bell crank lever 150 in a counterclockwise direction (Fig. 10) (clockwise direction Fig. 3) to move the lever 126 about its fulcrum 128 whereby the positioning member 36 is moved to gaging position.

Conveniently, the lever 126 is held yieldingly in each of its positions, that is, when the gage 36 is in gaging position and also when it is in inoperative position, (Figs. 9 and 10) by means of a spring 180 on a guiding rod 182 secured at its lower end in a block 184 (Fig. 9) pivotally mounted by pin 185 on the machine frame, in an arrangement wherein the rod 182 passes slidably through a block 186 pivotally mounted on the lower end of the lever 126. It will be clear from an inspection of Fig. 9 that the block 186, during movements of the lever 126, swings from one side to the other of a line connecting the centers of the pivot pins or studs 128 and 185 and that the spring 180, therefore, operates to hold the lever 126 yieldingly in each of its described positions. Preferably, and as shown, stops 190 and 192 are provided to limit the movements of the lever 126, the said stops being adjustably carried by a rod 194 secured to the machine frame, the lower end of the lever 126 being forked at 196, as shown most clearly in Fig. 8, to straddle the rod 194.

As stated above, the gage or positioning member 36 is withdrawn from its gaging position just after the holddown 38 is brought down on top of the forward end of the steel shank stiffener 22. To effect this movement of the gage 36 and its operating lever 126, there is provided a lever 200 pivoted at 202 on the frame of the machine and having an end portion 204 arranged to be engaged by a pin 206 carried by a slide block 208 mounted for vertical sliding movement in a guideway 210 in the machine frame. When this block 208 is moved downwardly (by means hereinafter described) the pin 206 contacts the end portion 204 of the lever 200 and causes the latter to swing in a counterclockwise direction (Figs. 9 and 10) (clockwise in Fig. 3) about its pivot 202 with the result that the link 140 is lifted from its operative position shown in Fig. 10 to its inoperative position shown in Fig. 9 by the contact of a finger 212 on the lever 200 with the middle portion of the link 140, the same swinging movement of the lever 200 serving to retract the lever 126 and its gage 36 from operative position through engagement of an end portion 214 of the lever 200 with a pin 215 carried by a projecting arm 216 rigid with the lever 126. At the end of this movement, the lever 126 is held yieldingly in its inoperative position (Figs. 9 and 10) by the spring 180 on the rod 182. To insure that the gage 36 will be removed from the path of the descending pad 40, in case it has accidentally been moved into the path of the pad, a cam member 215 (Fig. 3) is fastened to a block 217 (which carries the pad 40) in such manner that the cam edge will cam the gage 36 out of the way.

As indicated in the foregoing description, there are two separate and distinct downward movements of the treadle 110, the first causing the gages 34 and 36 to be moved into their operative positions in engagement with the upper surface of the insole member 20 so as to position the shank stiffener thereon. The second downward movement of the treadle, as already stated, brings down the holddown 38 and removes the gage 36 from operative position. In this connection it should be stated that the guide block 114, for the gage 36 and the holddown 38, is secured to the upper end of a carrier 219 (Figs. 1, 2, 3, 5 and 10) which is pivoted to the block 208 (Fig. 10) by the pin 205. To secure the described movements of the gage 36 and the holddown 38, the slide block 208 (Figs. 2 and 10) has secured thereto a crossbar 220 having a surface at 222 to be engaged by a pawl 224 on a pulldown lever 226 pivoted on the pin 158 in the forked block 160 at the upper end of the rod 162, a spring 227 being provided to hold the lever yieldingly in operative position. The pawl 224 engages on the second downward movement of the treadle a surface 230 at the top of the bar 220. For co-operation with the pulldown lever 226, there is provided a latch 232 pivoted at 233 on the bracket 163 rigid with the machine frame, the latch 232 being urged yieldingly toward latching position by a spring 236 fastened to the latch and to the machine frame at its opposite ends. On the first downward movement of the treadle 110 and of the pulldown lever 226 through engagement of the pawl 224 on lever 226 with the shoulder at 222, the latch 232 engages another portion of the same shoulder 222 to maintain the slide 208 in its depressed position against a spring 238 while the pulldown lever 226 rises again, under the action of a spring 240 surrounding rod 172, to a position where it may engage the upper surface 230 on the bar 220 so that a second depression of the treadle will cause another downward movement of the slide block 208, the latch member 232 again operating to engage another portion of the surface 230 to hold the slide bar 208 in its second depressed position. Both the pulldown lever 226 and the latch 232 are moved to inoperative positions about their pivot points, by means hereinafter described, to permit upward movement of the gage 36 and holddown 38 to their initial inoperative positions shown in the left unit in Fig. 1.

As stated early in the specification, the gage or positioning member 34 and the holddown 38 are moved out of the path of the pad 40 by the cam roll 42 (Figs. 1, 3, 5 and 10) in co-operation with a cam surface of the cam member 44. This movement of the gage 34 and the holddown 38 is rendered possible by the fact that they are mounted at the upper end of the carrier 219 (Fig. 10) which is pivoted on the pin 256, in an arrangement wherein the cam member 44 is carried by a member 250 pivoted upon a pin 252 in the upper end of the carrier bar 219. The member 250 carries two rolls 256 and 257 (Fig. 2) which operate to unlatch the upper ends of the pulldown lever 226 and the latch 232 from the surface 230. At the end of this movement of the member 44, a surface at 258 thereon engages an adjustable stop 259 on the carrier 219 to move the latter to the left in Fig. 10 after the release and upward movement of the said carrier 219, whereby the gage 34 and holddown 38 are moved out of the path of the pad 40 to the retracted position shown in Fig. 1 (right). In other words, when the cam roll 42 descends with the pad 40, the carrier 219 is swung to the left in Fig. 10 and to the right in Fig. 1 out of the path of the pad 40, this movement of the carrier 219 serving to effect removal of the gage 34 and of the holddown 38 since the latter two members are mounted upon the upper end of said carrier 219. During outward movement of the carrier 219, a spring 261 on a rod 263 is compressed, so that said spring may return the carrier and the gage 34 during upward movement of the cam roll 42.

As heretofore stated, the insole member 20 is centered in a widthwise direction on the mold 28 through the operation of pairs of gage members 30 and 32. As shown most clearly in Fig. 3, the gage members 30, 32 are mounted to turn about vertical pivot screws, one of which is shown at 269 in said figure as carried by a vertically movable slide member 270 supported yieldingly by a spring 272 backed by a bracket 273 adjustably mounted on the machine to enable the gages to co-operate with molds of different sizes and styles, as for instance in Fig. 5. It will be understood that there are a pair of gage members 30 to engage the heel end of the insole member 20 to center said heel end on the mold 28, the gage members 30 being drawn yieldingly toward each other by a spring 274 (Figs. 3 and 5). Similarly, there are two gage members 32 similar in most important respects to each other and drawn toward each other by a spring 276 to engage the shank portion of the insole member 20 on each side edge thereof in locating said member on the mold 28. Conveniently a plug 280 (Figs. 1, 3 and 5) is carried yieldingly (Fig. 7) by the pad block 217 which supports the pad 40, the plug 280 being arranged in line with one of the screws 269 to force the slide 270 in a downward direction ahead of the pad 40, the purpose being to retract the gages 30, 32 downwardly in timed relation to the movement of the pad 40 as the latter descends to effect a molding operation in co-operation with the mold 28. For a more complete disclosure of the gage members 30, 32 and their operating means, reference may be had to a pending application Serial No. 133,229, filed March 26, 1937 in the name of J. M. Whelton.

Figure 2:
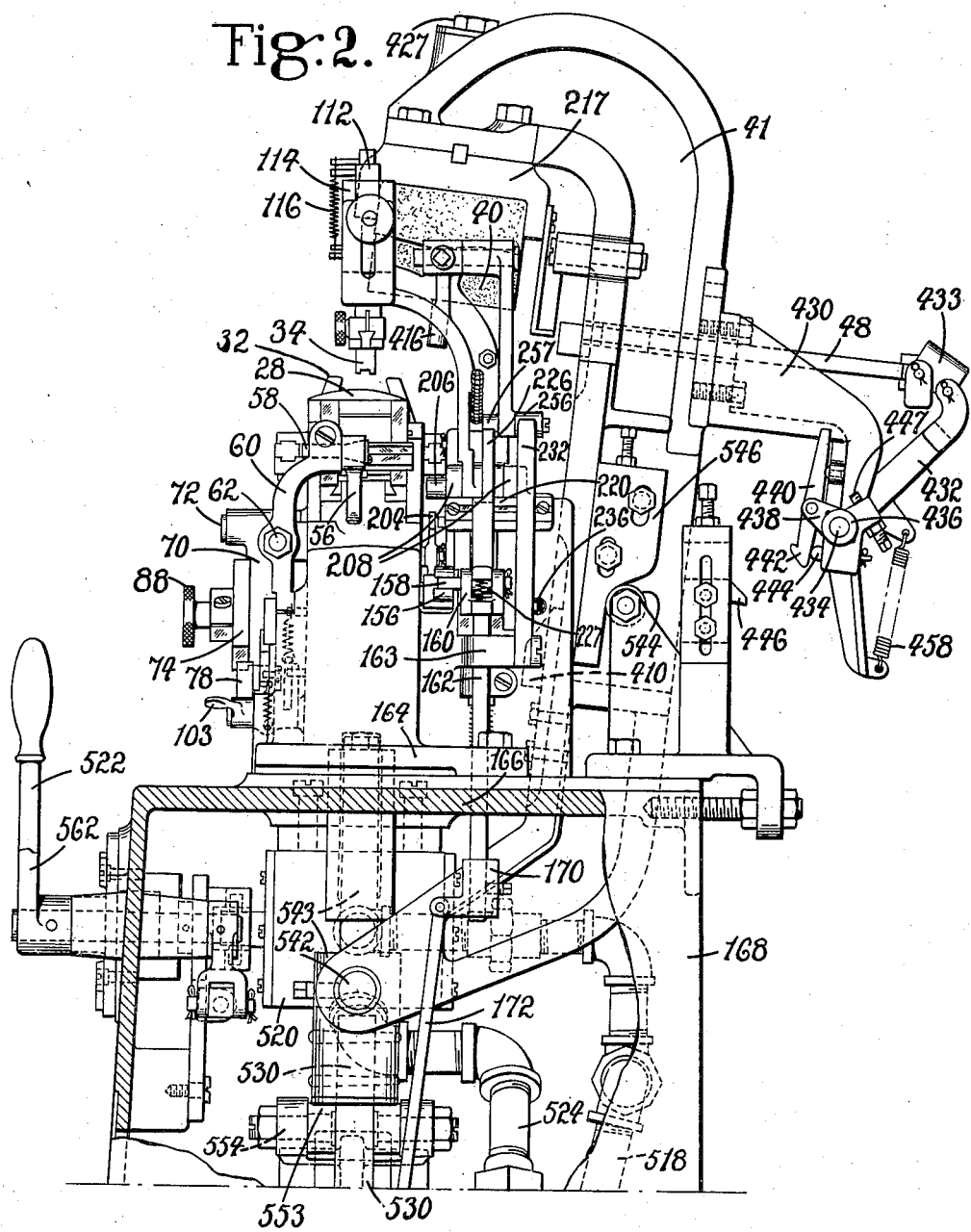
Fig. 2 is a side view of the machine shown in Fig. 1 looking from the right in Fig. 1, with the right-hand assembling and molding unit in work receiving position.

As the pad 40 rises following a molding operation the gage members 30, 32 return to their initial positions in which they project above the level of the mold 28 (29, Fig. 5). Consequently, it is necessary to lift the insole unit which has just been molded above the level of the gages 30, 32 in order that said insole unit may be readily ejected by the ejectors 46, 48 which move along substantially horizontal paths in their movements to eject the insole unit from between the molding members and into the delivery trough 50. For positioning the molded insole for the operation of the ejectors 46, 48 there is provided, in the illustrated construction, a plunger 390 (Figs. 3, 5 and 7) reciprocable in a correspondingly shaped passageway in the mold 28, (mold 29, Fig. 5) said plunger 390 being operated by a rod 392 (Fig. 7) connected to the plunger and pivotally connected to a lever 394 pivoted at 396 in the frame of the machine, said lever 394 having an arm 398 to which is pivotally connected at 400 a lever 402 yieldingly held at one end against a pin 404 in the arm 398 by a spring 406. At its other end the lever 402 carries a cam roll 408 arranged to be contacted by a cam member 410 adjustably connected by screws 412 to the overhanging arm 41 (Fig. 2). As the overhanging arm 41, which carries the pad 40, moves upwardly at the end of a molding operation, the cam roll 408 is operated, to the right in Fig. 7, by the cam member 410 to force the plunger 390 in an upward direction, thus lifting the molded insole unit from the mold 28 (29, Fig. 5). Because of the arrangement described, and particularly because of the spring 406, the cam roll 408 may readily return to its initial positon shown in Fig. 7 after it has passed by the lower end of the cam member 410. For returning the plunger 390 to its lower initial position, there is provided a spring 414 surrounding the rod 392.

To cooperate with the plunger 390 in holding a molded insole unit for the operation of the ejectors 46, 48, there is provided a spring-pressed plunger 416 (Figs. 3, 5 and 7) which normally projects from the lower or operative face of the pad 40. At the time of operation of the plunger 390 to lift the insole unit from the mold 28 (29, Fig. 5) the spring-pressed plunger 416 is still in contact with the upper surface of said insole unit, and the ejectors operate to eject the insole unit while the insole is still yieldingly held by the plungers 390 and 416. Incidentally, the plunger 416 has another and rather important function in that it contacts the insole unit prior to the removal of the holddown 38 to prevent displacement of said assembled unit. Preferably, and as shown in Figs. 5 and 7, the plunger 416 is backed by a light spring 418 and also by a much heavier spring 420 which becomes operative only at or slightly before the time that the pad 40 contacts the insole unit. By this arrangement the insole unit receives substantially as much pressure on the spot below the plunger 416 as it does through pressure applied by other portions of the pad 40. For holding the spring 420 in proper position there is provided a threaded member 422 and a sleeve 424, it being understood that the plunger 416, the springs 418 and 420 are all in a casing 425 which is removable with its contents and is normally held in place by a screw plug 427. When a mold of a different form, such as that shown at 29 in Fig. 5, is substituted for a mold 28 (Figs. 3 and 7) the plunger 416 should be adjusted upwardly. In such case, the threaded member 422, the spring 420 and the sleeve 424 are removed and then reinserted with the sleeve 424 below the level of the spring 420, whereas in the construction of Fig. 3 the sleeve 424 will be found above the inside casing 425.

In the illustrated construction, means is provided for operating the ejectors 46, 48 in timed relation to the plungers 390 and 416 through connections operated by the upward movement of the overhanging arm 41 which carries the pad 40. As shown in Figs. 2 and 6, the ejector operating means is mounted on a bracket 430 rigidly carried by the overhanging arm 41 and comprises a double armed lever 432 connected to the ejectors 46 and 48 through a pivoted double armed link 433, and a slide movable along a rod 435 fixed to the bracket 430, the slide and rod serving to secure straight line reciprocation of the ejectors 46, 48, in a well-known manner. Said lever 432 is pivotally mounted on a shaft 434 rotatable in a bearing 436 provided in the bracket 430. Secured to the shaft 434 is an arm 438 to the outer end of which is pivoted a latch 440 having a hooked lower end 442 which is spring pressed into operative position by a plunger 444 backed by a spring (not shown). When the overhanging arm 41 swings to the left in Fig. 2 and descends in a molding operation, the hook 442 slides along the projecting surface of an abutment 446, carried adjustably by the frame of the machine, until the hook 442 engages under the abutment 446. It will be readily understood that, in the subsequent upward movement of the pad 40 and the overhanging arm 41, the latch member 440, 442 in engagement with the abutment 446 effects an abrupt rotation of the shaft 434 in a counterclockwise direction, thus projecting the upper end of the lever 432 sharply to the left in Fig. 2 whereby the ejectors 46, 48 are positively operated to eject the molded insole unit in the yielding grip of the plungers 390, 416. At or near the inner limit of the movement of the lever 432, an adjustable stop 447 contacts the rear face of the latch 440 above its pivot point to cause disengagement of the latch from the abutment 446. While the lever 432 might have been rigidly secured to the shaft 434, the preferred construction is that shown in Fig. 6 wherein the lever 432 is pivotally mounted on the shaft 434 and is caused to rotate with the shaft by reason of the engagement of a ring 450, slidably keyed to the shaft 434 and backed by a spring 452, with a hub portion 454 of the said lever 432, the ring 450 having a projection 456 receivable in a correspondingly shaped notch in the hub 454, the purpose of this arrangement being to provide a yielding connection between the shaft 434 and the lever 432 thus making provision for a yielding of the ejectors in case some unusual obstruction is met by the latter. As shown, the lever 432 is returned by a spring 458 and is branched into two arms 460 at its upper end, so spaced that each may be connected to one of the ejectors 46, 48, it being preferable that the ejectors should be located one on each side of the axial line of the plungers 390 and 416 thereby insuring a more certain operation of the ejector means in removing the insole unit from between the plungers and depositing it in the trough 50.

Since the ejectors 46, 48 are utilized to remove an insole unit from the molds, whether the latter be of the type shown in Fig. 3 or in Fig. 5, it is advantageous to provide the ejectors with adjustable work engaging end members 46a and 48a. As shown, these are vertically adjustable in slots in the ends of the ejectors and may be either a tight fit in said slots, to such an extent that they will be maintained in adjusted position, or they may be secured in adjusted position by any well-known means for that purpose.

In the illustrated construction, special means is provided for mounting the slide 52 which carries the toe gage 26, thus adapting the mounting for adjustment for co-operation with molds of different shapes. For example, in Fig. 3, the mold 28 is of a type adapted for use in making insole units wherein the shank stiffener and the reinforcing piece are applied to that side of the insole which is to face the outsole of the shoe. In this case the parts of the unit are assembled with the foot engaging surface of the sole facing downwardly and the mold is shaped to provide a longitudinally concave surface 23 for imparting the desired longitudinal curvature to the shank portion of the unit. On the other hand the mold 29 is shaped to adapt it for use in making an insole unit of the type wherein the shank stiffener and the reinforcing piece are applied to that side of the insole which is to face the foot. In that case the parts of the unit are assembled with the foot engaging face of the sole facing upwardly and the mold 29 is shaped to provide a longitudinally convex surface 23a for imparting the desired longitudinal curvature to the shank portion of the unit. The upper mold member or pad 40 is shaped to co-operate with the mold 28 while the upper mold member or pad 40a is shaped to co-operate with the mold 29. Instead of making a change in the forepart sole supporting member, the illustrated construction discloses an arrangement wherein the forepart supporting member, together with its toe gage, may be readily adjusted for co-operation with a mold such as that at 28 (Fig. 3) or, alternatively, with a mold such as that shown at 29 (Fig. 5). Upon reference to Figs. 11 to 15, inclusive, it will be observed that the slide 52, which carries the toe gage 26, is mounted for sliding movement in a carrier 480 which is provided with a longitudinally extending slot into which projects an ear 482 integral with the slide 52 and having a conical opening therethrough. Located in said conical opening in the ear 482 is part of the pin 54, the other part of which is gripped by a split socket member 486 integral with the link 56, the purpose of the conical head of the pin 54 being to maintain a tight fit in spite of the wear to which these parts are normally subjected. In order that the carrier 480 may be adjusted from the position shown in Fig. 3, to that shown in Fig. 5, and also in the reverse direction, it is desirable that the said carrier turn about an axis located in the upper surface of said carrier. To secure this result the carrier 480 is provided with two spaced pins 490 on each side, said spaced pins on each side being arranged to travel in an arcuate groove 492 in each supporting plate 494. To hold the carrier 480 in its adjusted position and to locate it in such position, it is provided with a spring pressed plunger 496 (Fig. 15) adapted to drop into either one of two sockets 498, 500, (Fig. 11) the socket 500 serving to locate the carriage 480 and, therefore, the toe gage 26, in the position shown in Figs. 3 and 11, whereas the spring pressed plunger 496 will engage the socket 498 when the toe gage 26 is in the position shown in Fig. 5.

Power means is conveniently provided for operating the upper mold or pad 40 through the overhanging arm 41. In the illustrated construction, said power means comprises a motor 510 (Fig. 4) having a pulley 512, on its armature shaft, belted to a larger pulley 514 on a shaft 516 arranged to drive a gear oil pump, of well-known construction, in a chamber 517 whereby pressure is constantly maintained in a pipe 518 leading to a valve chamber 520 (Fig. 2) wherein there is provided a valve of special construction (not shown) arranged to be controlled by a hand lever 522. When this handle is turned in one direction, the oil under pressure is directed to a cylinder below one of the twin machines shown in Fig. 1, and when turned in the other direction the oil is transmitted under pressure to the hydraulic operating means beneath the other of the twin machines in Fig. 1. Since both of the hydraulic operating means are the same, a disclosure of one will suffice for both. From the valve chamber 520 (Fig. 2) oil under pressure is carried by a pipe 524 to the upper end of a small cylinder 526 (Fig. 4) thereby causing downward movement of a small piston 528. Since piston 528 is fastened to a piston rod 530 having rigidly connected thereto a large piston 532 in a large cylinder 534, the piston 532 is also forced downwardly. During downward movement of the large piston 532, oil is drawn into the large cylinder 534 from a surrounding tank 536 by means of a pipe 538 which leads to a valve chamber 540 from which the oil flows in the direction of the arrow into the upper end of the cylinder 534. Since the lower end of the overhanging arm 41 is pivoted at 542 (Fig. 2) to an extension member 543 secured to the upper end of the piston rod 530, downward movement of the latter also causes downward movement of the overhanging arm 41. At the very beginning of this downward movement of the overhanging arm 41, the latter is caused to swing forwardly by reason of the engagement of a cam roll 544 (Fig. 2) with a cam surface on the cam member 546 adjustably secured to the overhanging arm 41. The arrangement is preferably such that downward movement of the piston rod 530 by pressure back of the small piston 528 causes first a sharp forward movement of the upper end of the overhanging arm 41 to bring the pad 40 in vertical alinement with the mold 28, continued downward movement of the piston rod 530 serving to bring the pad down upon the insole unit assembled on the mold 28. By this time the small piston 528 on the piston rod 530 has descended so far as to uncover the end of a valve 550 (Fig. 4) which is promptly displaced backwardly against a spring 552 by the pressure which is built up due to the resistance of the work piece and mold to the downward movement of the pad 40. As soon as the valve 550 moves backwardly far enough against the spring 552, oil is admitted directly from the supply of high pressure oil in the small cylinder 526 into the large cylinder 534, thereby increasing greatly the pressure of the pad 40 on the work piece to perform the molding operation. Incidentally, the piston rod 530 is moved upwardly to lift the upper mold or pad away from the lower mold by a lever 553 (Figs. 1 and 2) pivotally supported at its middle portion by a stationary post 555, and pivotally connected at its ends by pins 554 to both piston rods 530 in the two hydraulic means. Hence, as one piston rod descends under hydraulic pressure, the other piston rod is lifted. For a more detailed description of this hydraulic mechanism, reference should be had to the copending application Serial No. 164,205 filed September 16, 1937, in the name of Stratton.

For insuring that both hands of the operator will be in a safe position during the operation of either of the presses shown in Fig. 1, it is necessary for the operator to grasp not only the handle 522 but also a handle 560 or a handle 562 which is below the mold unit that is next to be operated. Each handle 560, 562 controls a locking means (not shown) designed to prevent operation of the valve control handle 522. The arrangement is such that the operator must move handle 560 (or 562) to its extreme position toward the handle 522 before the valve control handle 522 can be operated, it being necessary also to hold the locking handle 560 or 562 in its releasing position in order to operate the valve handle 522 to effect operation of the press by the hydraulic means above described. Such operation of the handles effects a pressure applying operation of the selected press or mold unit and at the same time opening of the other press. The desired amount of pressure for a given line of molding operations may be secured by proper manipulation of another valve member 564 (Fig. 1) while watching a pressure indicator 566.

In operating the machine shown in Fig. 1 of the drawings, the operator assemblies upon the mold 28, in the left-hand mold unit or press, the parts of an insole unit beginning with an insole member 20. Assuming that the toe gage 26 has been adjusted to the desired position, an insole member 20 is placed with the toe portion thereof against said toe gage 26. By pulling outwardly on the gage 30, the gages 30, 32 of both pairs move away from each other to permit introduction of the shank and heel portion of the insole member 20 between said gages, which then operate to center the insole member in a widthwise direction upon the top of the mold 28. The operator then depresses the treadle 110 to bring down the positioning member or gage 34 to serve as a positioning means for the forward end of a shank stiffener 22. Simultaneously with the downward movement of the gage 34, the positioning member or gage 36 moves inwardly from the left in Fig. 1 to cooperate with the gage 34 in positioning the shank stiffener lengthwise of the sole member 20. After placing the shank stiffener on the insole member with the aid of the gages 34 and 36, the operator depresses the treadle 110 a second time to effect withdrawal of the gage 36 and to bring into position the holddown 38. With this member in position, the operator places a reinforcing piece 24 on top of the shank stiffener 22 and insole member 20, the gages 30, 32 serving to center the reinforcing member 24 widthwise of the insole member. With the parts of the insole unit thus assembled, the operator manipulates the handle 560 to unlock the valve control handle 522. While maintaining the handle 560 in its unlocking position, the handle 522 is moved to the left in Fig. 1 to effect application of molding pressure upon the insole unit thus assembled in the press at the left in Fig. 1. In this operation, the upper mold or pad 40 descends to co-operate with the lower mold 28. At the same time, the molding unit at the right in Fig. 1 is returned to work receiving position, i. e. the mold or pad member 40 rises, and at a predetermined point in its upward movement the ejectors 46, 48 operate to eject the molded insole from the yielding grasp of the work positioning plungers 390 and 416 (Fig. 5). A new insole unit is then assembled upon the mold 28 in the molding press at the right of Fig. 1 while the molding operation is continued in the press at the left in Fig. 1.

Having described our invention, what we claim as new and desire to secure by Letters Patent of the United States is:

1. In a machine for assembling shoe parts, a pair of assembling mechanisms each having an adjustable gage for positioning a shoe part with respect to its associated mechanism, two members one associated with each gage to support and adjust the latter, and a unitary member attached to said gage supporting members and movable to effect simultaneous adjustment of the gages, said unitary member being of a length related to the distance between said gages and being slidably mounted for movement in the direction of its length to adjust the gages.

2. In a machine for assembling shoe parts, a pair of assembling mechanisms each having an adjustable gage for positioning a shoe part with respect to its associated mechanism, two members one associated with each gage to support and adjust the latter, a member connecting the gage supporting members, a manually operable member, a link member adjustably attached to said connecting member and to said manually operable member, the latter being movable to effect adjustment of the gages, and indicating means at one end of the adjustable link member to indicate adjustments for a certain dimension of the shoe parts and at the other end of the link member to indicate adjustments for variations in the shoe parts due to differences in style.

3. In a machine for assembling shoe parts, a pair of assembling mechanisms each having an adjustable toe gage for positioning an insole with respect to each of said mechanisms, two slide members one associated with each toe gage to adjust the latter, a member attached to said slide members and movable in the direction of its length to effect simultaneous adjustment of the toe gages, a lever mounted on the machine, adjustable connections between the lever and the lengthwise movable member whereby the latter may be moved variably by said lever, and a scale associated with the said adjustable connections to indicate the adjustment of both gages.

4. In a machine for assembling shoe parts, a pair of assembling mechanisms each having an adjustable toe gage for positioning an insole with respect to each of said mechanisms, two slide members one associated with each toe gage to support and adjust the latter, a manually operable member, a unitary member attached to said slide members and slidably mounted on the frame of the machine to effect adjustment of both toe gages, a connecting link member adjustably connected at one end to said manually operable member and at its other end to said unitary member, and indicating means at each end of the link member to indicate adjustments for length of the shoe parts and for variations due to differences in style.

5. In a machine for assembling shoe parts, a pair of assembling mechanisms each having an adjustable toe gage for positioning an insole with respect to each of said mechanisms, two members one associated with each toe gage to adjust the latter, a member slidably mounted on a stationary part of the machine frame and pivotally connected to the toe gage adjusting members to effect simultaneous adjustment of the latter, a handle attached to said slidably mounted member for manual operation of the latter to adjust said toe gages, and means comprising a scale carried by said slidably mounted member to predetermine the effect of the movement of said slidably mounted member on said toe gages whereby the latter may be simultaneously adjusted in accordance with the size and style of the insole.

6. In a machine for assembling shoe parts, a pair of assembling mechanisms each having an adjustable toe gage for positioning an insole with respect to each of said mechanisms, two members one associated with each toe gage to support and adjust the latter, a slidably mounted member attached to said supporting and adjusting members and movable to effect simultaneous adjustment of both toe gages, an operating member for said slidably mounted member pivotally mounted on the frame of the machine, and a transmission member adjustably attached to said operating member and to said slidably mounted member whereby the effect of the movement of said slidably mounted member with respect to said toe gages may be predetermined through said adjustments of said transmission member in accordance with the size and style of the insole.

7. In a machine for assembling shoe parts, a pair of assembling mechanisms each having an adjustable toe gage for positioning an insole with respect to each of said mechanisms, two members one associated with each toe gage to adjust the latter, a slidably mounted member attached to said toe gage members and movable to effect adjustment of both toe gages, an operating member for said slidably mounted member pivotally mounted on the frame of the machine and having an arcuate slot therein, said pivotally mounted operating member having associated therewith indicating means to indicate adjustments of the gages for size, and a transmission member adjustably attached at one of its ends to said operating member for adjustment along the arcuate slot in the latter to secure adjustment of the toe gages for variations due to changes in style of the shoe insole and also adjustably attached at the other of its ends to said slidably mounted member, the last adjustment being for marked variations in the lengths of the insoles, whereby the adjustment of said toe gages through operation of said operating member may be predetermined in accordance with the style, size, and range of lengths of said insoles.

8. In a shoe part assembling and molding machine, a lower presser member or mold, a mold member or pad for cooperation with the lower mold in molding operations, means for causing relative approaching and separating movements of the pad and mold, a positioning member for the front end of a shoe part placed on said mold, means for moving said positioning member into operative position, a second positioning or locating member movable toward the first-mentioned positioning member to engage the said shoe part at a point in its contour directly opposite to that engaged by the first-mentioned positioning member, and means operated in timed relation to said moving means to move said locating member into operative position to co-operate with the first-mentioned positioning member in locating said shoe part on the mold.

9. In a shoe part assembling and molding machine, a lower presser member or mold, a mold member or pad for co-operation with the lower mold in molding operations, means for causing relative approaching and separating movements of the pad and mold, a positioning member for the front end of a shoe part placed on said mold, said positioning member engaging the shoe part at or adjacent to one end of the longitudinal axis of the shoe part, a member carrying said positioning member, means to move said carrying member in a direction to move the positioning member into operative position, a second positioning or locating member to engage said shoe part at the other end of the longitudinal axis thereof, and means operated by said carrying member to cause said locating member to be moved toward the first-mentioned positioning member and into position to co-operate with the latter in locating a shoe part on the mold.

10. In a shoe part assembling and molding machine, a lower presser member or mold, a mold member or pad for co-operation with the mold in molding operations, means for causing relative approaching and separating movements of the pad and mold, a positioning member for the front end of a shoe part placed on said mold, a vertically movable slide carrying said positioning member, means for moving said slide in a downward direction to move said positioning member into operative position, a second positioning or locating member to engage the other end of said shoe part, and means operated by said slide to move said locating member into operative position on said downward movement of the slide.

11. In a shoe part assembling and molding machine, a lower presser member or mold, a pad for co-operation with the lower mold in molding operations, means for causing relative approaching and separating movements of the pad and mold, a positioning member for the front end of a shoe part placed on said mold, a vertically movable slide carrying said positioning member, means for moving said slide in a downward direction to move the positioning member into operative position, a second positioning or locating member to engage the other end of said shoe part, a lever movable about a horizontal axis and carrying the locating member at its upper end, and a lever operated by said slide to swing the upper end of the first-mentioned lever and the locating member carried thereby laterally toward the first-mentioned positioning member to co-operate therewith in locating a shoe part on the mold.

12. In a shoe part assembling and molding machine, a lower presser member or mold, a pad for co-operation with the lower mold in molding operations, means for causing relative approaching and separating movements of the pad and mold, a positioning member for the front end of a shoe part placed on said mold, a vertically movable slide carrying said positioning member, means for moving said slide in a downward direction to move the positioning member into operative position, a second positioning member to engage the other end of said shoe part, a member carrying the second-mentioned positioning member and operated by said slide during downward movement of the latter, whereby the second positioning member is moved into co-operative relation with respect to the first-mentioned positioning member, and means to lock said slide against movement toward its initial position whereby both positioning members are held in position to locate said shoe part.

13. In a shoe part assembling and molding machine, a lower presser member or mold, a pad for co-operation with the lower mold in molding operations, means for causing relative approaching and separating movements of the pad and mold, a positioning member for the front end of a shoe part placed on said mold, a vertically movable slide carrying said positioning member, manually operable means for moving said slide in a downward direction to move the positioning member into operative position, a second positioning member to engage the other end of said shoe part, a member carrying the second-mentioned positioning member and operated by said slide during downward movement of the latter, whereby the second positioning member is moved into co-operative relation to the first-mentioned positioning member, means to lock said slide against movement toward its initial position whereby both positioning members are held in work locating position, said slide being movable further in a downward direction by said manually operable means to effect movement of the second positioning member to inoperative position, and means operated in timed relation to the relative approaching movement of the pad and mold to re-operative position, a second positioning member to inoperative position prior to a molding operation.

14. In a shoe part assembling and molding machine, a mold mounted on a stationary part of the machine frame, a pad for co-operation with the mold in molding operations, a head carrying said pad, means for moving the pad toward and from said mold, a positioning member for the front end of a shoe part, a vertically movable slide carrying said positioning member, manually operable means for moving said slide in a downward direction to move the positioning member into operative position, a second positioning member to engage the other end of said shoe part, a member carrying the second-mentioned positioning member, a lever operated by said slide to operate said carrying member whereby the second positioning member is moved into operative position upon downward movement of said slide, means to lock said slide against movement toward its initial position whereby both positioning members are held in operative position, said slide being movable further in a downward direction to effect movement of the second positioning member to inoperative position, a second locking means operative to prevent return of said slide to initial position whereby the first-mentioned positioning member is held in operative position, and means controlled by said head for removing said first-mentioned positioning member from operative position prior to a molding operation.

15. In a shoe part assembling and molding machine, a mold mounted on a stationary part of the machine frame, a pad for co-operation with the mold in molding operations, a head carrying said pad, means for moving the pad toward and from said mold, a positioning member for the front end of a shoe part, a vertically movable slide carrying said positioning member, manually operable means for moving said slide in a downward direction to move the positioning member into operative position, a second positioning member to engage the other end of said shoe part, a member carrying the second-mentioned positioning member arranged to be operated by said slide whereby the second positioning member is moved into operative position upon said downward movement of said slide, means to lock said slide against movement toward its initial position whereby both positioning members are held in operative position, a holddown member to engage the shoe part from above, said slide being movable further in a downward direction to effect operative movement of said holddown and also movement of the second positioning member to inoperative position, a second locking means operative to prevent return of said slide to initial position whereby the first-mentioned positioning member and holddown are held in operative position, and means operated by said head during its descent toward the mold to effect withdrawal of the first positioning member and to insure withdrawal of the second positioning member prior to a molding operation.

16. In a machine for molding shoe parts, a mold mounted on the machine frame, an upper mold member or pad to effect a molding operation in co-operation with the mold, a swinging head supporting said pad, a cam member and a cam roll mounted on said frame and head respectively, and means to move said pad in a direction toward said mold to effect a molding operation, said cam and cam roll being arranged to effect movement of the head and pad into vertical alinement with the mold prior to movement of the pad into co-operative relation with the mold.

17. In a machine for operating upon shoe parts, a mold member mounted on a stationary part of the machine frame, a movable mold member for co-operation with the first-mentioned mold member, a support for the second mold member, means for causing relative approaching and separating movements of the mold members during molding operation, a work piece ejector movable with the movable mold member during the said approaching and separating movements thereof, and positively operated means to operate the ejector during the relative separating movement of the mold members, whereby the work piece is ejected following treatment by said mold members.

18. In a machine for operating upon shoe parts, a mold member mounted on a stationary part of the machine frame, another mold member for co-operation with the first-mentioned mold member, a support for the second-mentioned mold member movable to operate the latter, means for moving said support and the mold member carried thereby in directions toward and from the other mold member, a work piece ejector carried by said support, a lever connected to the ejector, a latch member pivotally connected to the lever, and a stationary catch arranged to be engaged with the latch member on movement of said support and its associated mold member toward operating position, the arrangement being such that the latch member is caused to operate the ejector on separating movement of said mold members following a molding operation.

19. In a machine for operating upon shoe parts, a mold member mounted on a stationary part of the machine frame, a second mold member for co-operation with the first-mentioned mold member, a support for the second-mentioned mold member movable to operate the latter, means for moving the support and its associated mold member in directions toward and from the other mold member, one of said mold members serving as a support for the shoe part, shoe part positioning members, one carried by the frame of the machine and the other by said mold member support, and movable toward each other respectively through openings in the mold members to grip the molded shoe part and to position it above the surface of the shoe part supporting mold member upon separation of the mold members, and ejector means operable to project said shoe part from the grip of the positioning members.

20. In a machine for operating upon shoe parts, a mold mounted on a stationary part of the machine frame, a mold or pad for co-operation with the first-mentioned mold, a head to support the pad and operate the latter, means for moving the head and the pad carried thereby in directions toward and from the mold, shoe part positioning members carried by the frame of the machine and by said head and movable respectively through openings in the mold and pad to grip the molded shoe part and to position it above the surface of the mold upon separation of the mold and pad, and a pair of ejectors one on each side of said shoe part positioning members and operable to project the shoe part from the grip of the positioning members.

21. A machine according to the terms of claim 20, in which the ejector is provided with an adjustable work engaging end member adapting the ejector for operation upon shoe parts held at different levels by the said shoe part positioning members.

22. A machine according to the terms of claim 20, in which spring means is provided for backing one of the shoe part positioning members so that the shoe part is yieldingly held for the operation of the ejectors.

23. In a machine for operating upon shoe parts, a mold mounted on a stationary part of the machine frame, a mold member or pad for co-operation with the mold, a head to support the pad and operate the latter, means for moving the head and the pad carried thereby in directions toward and from the mold, shoe part positioning members carried by the frame of the machine and by said head and movable respectively through the mold and pad to grip the molded shoe part and to position it above the surface of the mold following a molding operation, a trough to receive the molded shoe part, and a pair of ejectors located one on each side of the shoe part positioning members and operable to deliver the shoe part from the positioning members to said trough.

24. In a machine for operating upon shoe parts, a mold mounted on a stationary part of the machine frame, a pad for co-operation with the mold, a head to support the pad and operate the latter, means for moving the head and the pad carried thereby in directions toward and from the mold, shoe part positioning members carried by the frame of the machine and by said head and movable respectively through the mold and pad to grip the molded shoe part and to position it above the surface of the mold upon separation of the mold and pad, an ejector operable to strike said shoe part from the grip of the positioning members, spring means backing the upper shoe part positioning member so that the shoe part is yieldingly held for the operation of the ejector, other spring means arranged to become operative during the molding operation to effect heavy pressure on the upper shoe part positioning member whereby said member takes part in the molding operation, and means for positively operating the lower shoe part positioning member.

FRANK KENNISON.
FRANK E. STRATTON.

CERTIFICATE OF CORRECTION.

Patent No. 2,151,974. March 28, 1939.

FRANK KENNISON, ET AL.

It is hereby certified that error appears in the printed specification of the above numbered patent requiring correction as follows: Page 9, second column, lines 21 and 22, claim 13, for "re- operative position, a second" read remove the first-mentioned; page 10, first column, line 31, claim 17, for "operation" read operations; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.